United States Patent Office 3,382,563

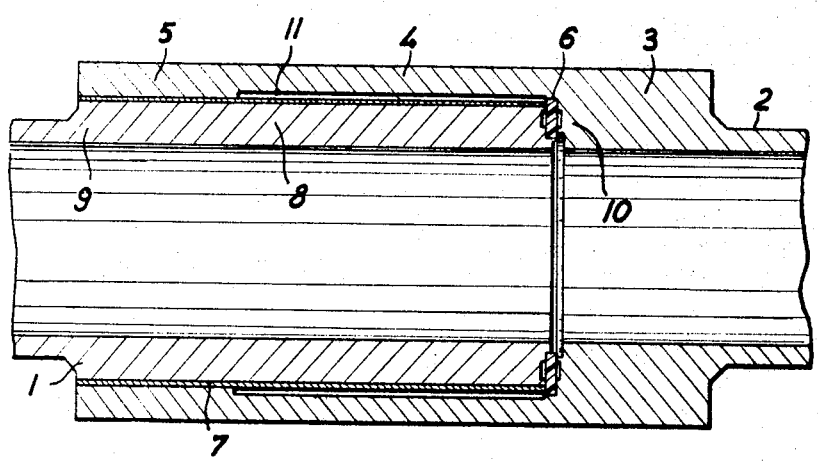

Patented May 14, 1968

3,382,563

LEAK-TIGHT JOINT AND METHOD OF FORMING SAME

Aimé Barroil, Moirans, and André Michel and André Teytu, Grenoble, France, assignors to Commissariat à l'Energie Atomique, Paris, France Filed Jan. 8, 1965, Ser. No. 424,404
Claims priority, application France, Jan. 24, 1964, 961,538
2 Claims. (Cl. 29—447)

ABSTRACT OF THE DISCLOSURE

A leak-tight joint between a female member and a male member, and a method for forming the same. The female member contains an annular shoulder, and the terminal portion of said member has an interference fit with an intermediate portion of the male member when both are at the same temperature. The male member has a radial shoulder thereon positioned to confront the annular shoulder, and when the members are assembled there is an uninterrupted annular space extending from said radial shoulder to the terminal portion of the female member. To assemble the joint the members are brought to different temperatures and a seal is disposed between the two shoulders, after which the female member is fitted over the male member until the seal is engaged by the confronting shoulders. The terminal portion of the female member is then quickly returned to the temperature of the male member to lock the members together, after which the remainder of the members are allowed to return to the same temperature. As the remainder of the members return to the same temperature an axial compressive force is generated, which directly compresses the seal between the two shoulders.

The present invention is concerned with a leak-tight joint and with a method of forming said joint. One object of the invention is to provide leak-tight joints of small overall size which are designed to withstand high temperatures and pressures. A further object of the invention is to provide leak-tight joints of this type which have at the same time a high electric resistance.

This invention relates to a leak-tight joint comprising a male element and a female element of revolution, characterized in that the female element consists of a terminal portion which is adapted to come into frictional contact with a first portion of the male element and a portion which is located opposite to a second portion of said male element so as to form an annular chamber with said second portion, an annular seal being interposed between a radial end-face of said male element and a cooperating annular shoulder of said female element.

The invention also relates to a method for constructing a joint of this type, said method being characterized in that it consists in heating the female element so as to produce the expansion thereof, in positioning the annular seal between the radial end-face of the male element and a cooperating annular shoulder of the female element, in fitting said female element over said male element, in subjecting the terminal portion of the female element to a rapid cooling process so as to shrink said terminal portion onto the first portion of the male element, in then subjecting that portion of said female element which is located opposite to a second portion of the male element so as to form an annular chamber therewith to a cooling process which is intended to produce the longitudinal contraction of said portion of female element and to compress the annular seal.

Among the main advantages of the invention should be mentioned the simplicity of application of the method which is proposed as well as the very small overall size of the joint which is formed as compared with the usual modes of jointing such as those which make use of flanges. Furthermore, if the respective dimensions of the different portions of the elements as well as the operating conditions are suitably chosen, the method according to the invention finally permits the possibility of exerting a considerable clamping force on the annular seal. It is therefore possible to form said annular seal of a material which has low malleability.

The joint obtained has an additional advantage in that it remains leak-tight even when it is subjected to high pressure or to a very high temperature on condition, however, that the materials of which the elements are formed and which may be dissimilar nevertheless have closely related coefficients of expansion.

Another advantage of the method according to the invention which is of particular interest lies in its possibilities of application to the construction of joints which provide electrical insulation. To this end, at least one of the elements is previously coated, at least in the shrinking-on zone, with a layer of insulating material, for example a layer of ceramic material applied by spraying process, whilst the annular seal can also be formed of an insulating material such as mica. Both the electrical insulation thus obtained and the leak-tightness of the joint are thus capable of withstanding very severe conditions of temperature and of pressure.

A further advantage of the invention lies in the possibility of disassembly of the joints formed. It is, in fact, merely necessary to subject the female element to local heating in the shrinking-on zone in such a manner as to cause said element to expand without producing action on the male element. Disassembly is therefore facilitated in the case in which a layer of ceramic material is interposed between the two elements for the purpose of providing thermal insulation.

The single figure of the drawing is a vertical sectional view through the completed leak-tight joint of the invention, showing an annular seal clamped between an annular shoulder on the female member and a confronting radial shoulder on the male member.

Reference being made to the accompanying drawings, there will now be described below one particular mode of application of the invention which is chosen solely by way of explanatory example without any limitation being implied.

As shown in the figure, the two elements which it is desired to join together consist of a male tube 1 and a female tube 2 in the end of which said male tube is intended to be inserted.

The female tube 2 consists of:

A portion 3 having an internal diameter which is substantially equal to the internal diameter of the male tube 1 and which forms an abutment against which said male tube is intended to be applied;

An intermediate portion 4 which forms the contraction zone, the internal diameter of which is larger than the external diameter of the corresponding portion 8 of the male tube 1, with the result that said intermediate portion forms with said male tube an annular chamber 11;

A terminal portion 5, the internal diameter of which, prior to the jointing operation, is slightly smaller than the normal external diameter of the corresponding portion 9 of the male tube 1. The difference between these two diameters is of the order of a few hundredths of a millimeter.

The male tube 1 has a substantially uniform cross-sectional area throughout the jointing zone which comprises the portions 8 and 9. Provision is made within the entire zone referred-to for an insulating layer 7 of ceramic material which is applied by means of a spray-gun.

An annular seal 6 of mica having a suitable thickness can be placed against the annular shoulder 10 formed by the portion 3 of the female tube, said shoulder as well as the extremity of the male tube 1 having a suitably designed profile and a suitable state of surface.

In order to form the joint according to the invention, the female tube 2 is heated up to a temperature which is sufficient to ensure that the expansion thereof permits the mutual fitting together of both tubes. The male tube 1 is then inserted in the female tube 2 and the annular seal 6 is interposed between the extremity of the male tube 1 and the annular shoulder 10 of the female tube. There is then produced by spraying with water a very rapid cooling of the terminal portion 5 which constitutes the shrinking-on zone and which is thus bonded to the male tube. The intermediate portion 4 is then cooled also. Inasmuch as said intermediate portion is fixed at that end thereof which corresponds to the end of the shrinking-on zone, the longitudinal contraction of said intermediate zone produces the flattening of the annular seal 6 by compression.

Conversely, it is possible to disassemble said joint by subjecting the terminal portion 5 of the female tube to a rapid localized heating by means of an induction heating system, for example. The disassembling operation is facilitated by the presence of the ceramic layer which forms a heat insulation, thereby preventing the expansion of the male tube.

In a particular case of application of the method described in the preceding paragraphs, there has been formed a joint between two tubes of stainless steel, wherein electrical insulation was provided on the one hand by means of a gasket of mica and on the other hand by means of a layer of zirconia applied on the male tube. The joint thus obtained proved perfectly leak-tight with respect to the organic liquids employed as coolant in nuclear reactors, up to a temperature of 400° C. and under a pressure reaching 40 kgs./cm.$^2$.

The electric resistance between the two elements was in this same case 20,000 ohms. However, it should be noted that this last-mentioned characteristic, which depends on the ceramic material employed, can be improved even further, for example by replacing zirconia by alumina.

What we claim is:

1. A method for fluid tightly securing together a male tubular member and a female tubular member, the end portion of said female member having an interference fit with an intermediate portion of said male member when at the same temperature as said intermediate portion, said female member having an annular shoulder therein spaced from said end portion, and said male member having a radial shoulder thereon, said radial shoulder being positioned between said end portion of said female member and said annular shoulder and confronting said annular shoulder when said male member is received within said female member, said method comprising the steps of bringing the parts to be connected of said female and male members to different temperatures, positioning an annular seal between said radial shoulder of said male member and said cooperating annular shoulder on the female member, fitting said female member over said male member until the confronting surfaces of said shoulders engage said annular seal, there being at all times an elongated uninterrupted annular space between said end portion of said female member and said radial shoulder so that regardless of their relative temperatures said members remain unengaged over the axial length of said annular space, bringing back rapidly to the same temperature said end portion of said female member and said intermediate portion of said male member whereby to lock together said female member and said male member, and then leaving the remainder of said male and female members to come back to the same temperature, whereby the relative axial shrinkage between said members occurring as said members return to the same temperature generates an axial compressive force all of which is utilized directly to compress said seal between the confronting surfaces of said shoulders.

2. A method as recited in claim 1, wherein a layer of insulating material is applied as a preliminary operation on at least said intermediate portion of said male member, and wherein said annular seal is made of insulating material and said radial shoulder is of smaller diameter than the inner diameter of said female member, whereby when said members are assembled said male member is insulated from said female member.

References Cited

UNITED STATES PATENTS

| Re. 21,006 | 2/1939 | Brickman et al. | 285—381 |
| 1,986,357 | 1/1935 | Perry | 285—54 X |
| 2,636,753 | 4/1953 | Griffin | 285—115 |
| 2,867,463 | 1/1959 | Snider | 285—52 X |
| 2,940,787 | 6/1960 | Goodner | 285—47 X |

EDWARD C. ALLEN, *Primary Examiner.*

CARL W. TOMLIN, *Examiner.*

R. G. BERKLEY, *Assistant Examiner.*